UNITED STATES PATENT OFFICE.

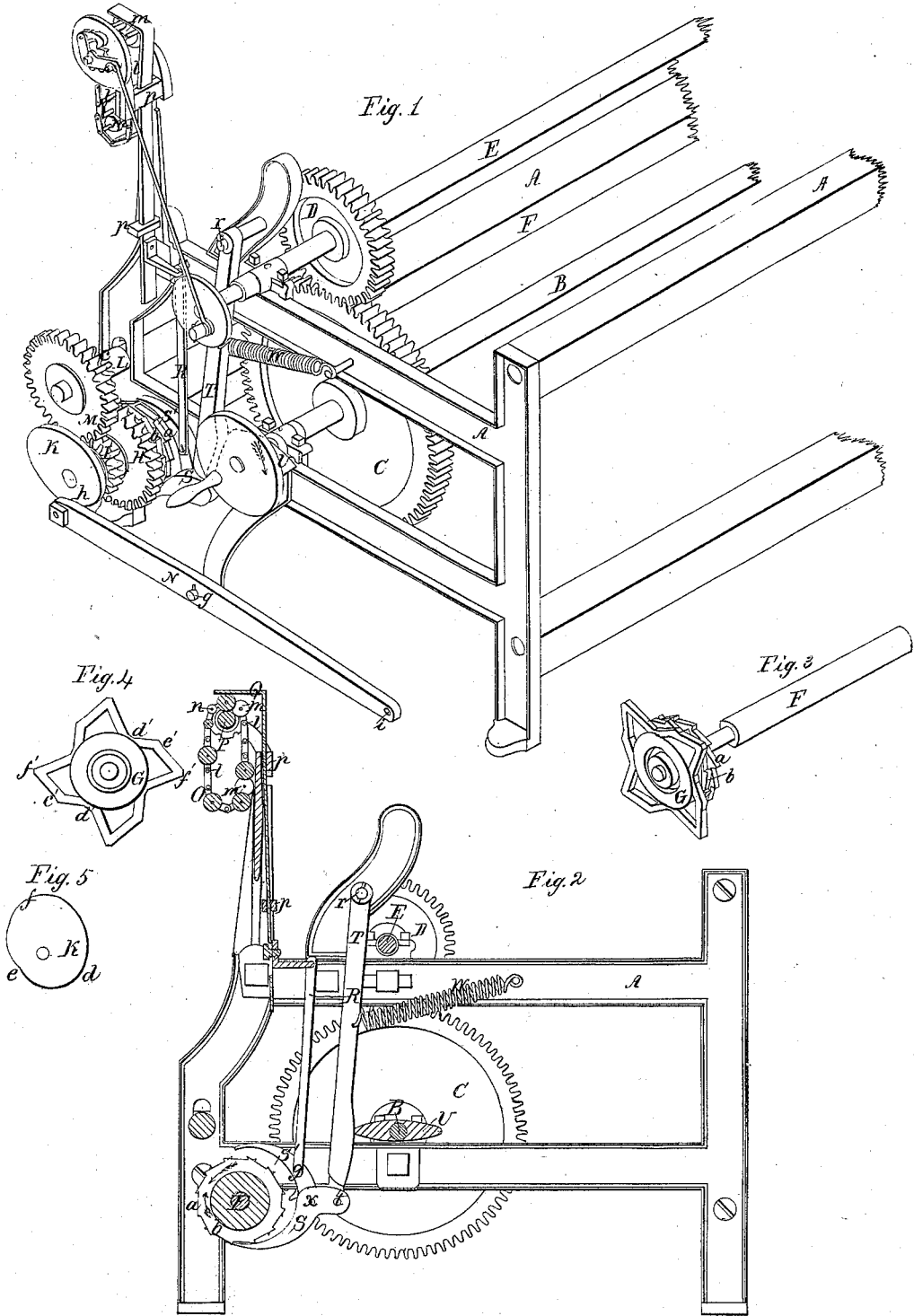

EDWARD W. BROWN, OF FALL RIVER, MASSACHUSETTS.

LOOM.

Specification forming part of Letters Patent No. 11,352, dated July 25, 1854; Reissued March 14, 1865, No. 1,901.

*To all whom it may concern:*

Be it known that I, EDWARD W. BROWN, of Fall River, in the county of Bristol and State of Massachusetts, have invented certain new and useful Improvements in Looms for Weaving Checks and Plaids; and I hereby declare the following to be a full, clear, and exact description of the same, reference being had to the annexed drawings, making a part of this specification, in which—

Figure 1 is an isometric perspective of a loom with my improvements attached, those portions of the loom not necessarily connected with my improvements not being represented. Fig. 2, is a transverse section through the same immediately in front of the ratchet wheels upon the cam shaft. Fig. 3, is an isometric view of the box cam, which may be employed to give motion to the shuttle boxes, in place of the arrangement represented in Fig. 1. Fig. 4, is a front view of the cam wheel represented in Fig. 3. Fig. 5, is a view of the cam represented in Fig. 1 at K.

The nature of my invention consists in a new and peculiar construction and arrangement of the parts employed to give motion to the drop boxes of looms, for weaving checks and plaids, which enables me materially to add to their simplicity and effectiveness. In most looms of this description, the cam shaft has been revolved constantly in one direction, and the consequence has been that where three shuttles were made use of, it was not at all times possible to make the desired transition from one color to another. To remedy this inconvenience, two ratchet wheels have been placed upon the cam shaft, having their teeth pointing in different directions, which wheels were moved by separate and independent pawls, each being governed by a separate pattern chain; by this arrangement the cam shaft might be revolved in either one direction or the other, but if the least mistake were made in the setting of the pattern chain, or if one of a great many accidents occurred, to which a loom is liable, both pawls were let fall upon their respective ratchet wheels at the same instant, and upon the next revolution of the lathe shaft the loom was inevitably broken. To remove this difficulty and at the same time to secure an arrangement of parts far simpler and more compact than any other with which I am acquainted, is the object of my present invention, which may be described as follows:

A is the framework of the machine, B the driving shaft, carrying the cog-wheel C, which gears with the wheel D upon the lathe shaft E.

F is the cam shaft which carries the cam wheel G, Figs. 3 and 4, or other appropriate devices for moving the shuttle boxes.

$a$, $b$, are ratchet wheels secured to the shaft F, and having teeth pointed in different directions.

In Fig. 1 H is a cog wheel secured to the cam shaft F. I is a cog wheel made fast to the cam K, the two running together loosely upon the shaft F. L is a short shaft secured to the main frame, having a cogged pinion $c$, and a cog-wheel M secured thereto. The wheel M engages with the wheel I, and the wheel H with the pinion $c$.

The cam K Fig. 5, has three rests $d$, $e$, $f$, 120° distant from each other; and the gears H, $c$, M, I, are so arranged and proportioned with respect to each other, that when the cam shaft is revolved an amount equal to the length of one of the teeth of the ratchet wheels $a$, $b$, the cam shaft shall be caused to make the third of a revolution.

N is a lever pivoted near its center at $g$, and carrying a roller $h$ at one end which rests against the periphery of the cam K and is made to bear upon the rests $d$, $e$, $f$, as the cam revolves. The other end of the lever N, is connected at $i$ with the foot of the apparatus which raises and falls the boxes, but which not differing from that usually employed for this purpose is not shown in the drawings.

O is the pattern chain which governs the motion of the cam shaft. This chain is made to revolve intermittently upon the shaft P, in the usual manner by means of the connections seen in Fig. 1 with the lathe shaft E. The spindles $l$ of this chain may be made to carry rollers of two different sizes $m$, $m$, or they may run empty.

Q is a bent rod sliding freely up and down in mortises in the supports $p$ and connected with the arm R, by which the pawls S, S′ are actuated.

T is an arm pivoted to the framework at $r$, and borne against the cam U, upon the main driving shaft B, by the spring W.

The pawls S, and S', are connected together in the following manner: The former is pivoted to the arm T, at $t$. The pawl S', is secured to the pawl S, at $x$, the two being allowed to move freely upon the point $t$.

If now the pattern chain O, be in the position represented in Fig. 2 the rod Q, will be raised to its extreme height by the rollers M and the pawl S will be brought in contact with the ratchet wheel $b$, and as the main shaft B revolves the cam U, vibrates the arm T, and the cam shaft F, is revolved in the direction indicated by the red arrow Fig. 2, and the shuttle boxes are raised or lowered as the case may be according to the position of the cam K. When the roller $n$, is beneath the horizontal portion of the rod Q, neither of the pawls S, S', is in contact with its ratchet wheel, and as the cam U revolves no motion will be communicated to the shaft F, and the shuttle boxes remain stationary. When by the revolution of the pattern chain one of the spindles $l$ intervenes between the shaft P and the rod Q, the latter descends to its lowest position and the pawl S', comes in contact with the teeth of the ratchet wheel $a$, and as the cam U revolves the cam shaft F is revolved in the direction indicated by the black arrow. It will thus be perceived that by means of the spindles $l$, and the rollers $m$, $n$, I am enabled as may be required to revolve the cam shaft in either direction or to allow it to remain at rest while the other motions of the loom continue.

It is evident that no contingency, carelessness or accident can bring the two pawls simultaneously in contact with their ratchet wheels, for should the connection $y$, or any of the parts immediately above it give way, the pawl S' falls upon its ratchet wheel, and the other pawl falls with it, or should either of the connections $x$, $t$ or $r$, be broken, no further breakage or injury could result from the accident.

In the arrangement represented in Fig. 1, for the purpose of transmitting the motion of the ratchet wheels to the box cam K it will be perceived that the shuttle boxes are raised with a small expenditure of power, compared with what is required to revolve the cam G, owing to the gradual ascent between the rests $d$, $e$, $f$, of the cam K. The ordinary cam wheel G represented in Figs. 3, and 4, may however be made use of in connection with the method described of driving the cam shaft, in which case the ratchet wheels having twelve teeth, the cam shaft will be caused to make a twelfth of a revolution, each time the pawls S, S', impinge against the teeth of the ratchet wheels, and the roller $h$ will bear against the periphery of the cam wheel, and rest at the points $d'$ $e'$ $f'$. Owing however to the steepness of the ascent between the rests $d'$ and $f'$, much more friction will result from this arrangement of parts than when the cam K is employed.

Among the advantages resulting from the above described combination and arrangement of parts may be enumerated the following: But a single pattern chain is used to operate both the ratchet wheels; but one connection and that a simple rod or vertical bar, is required between the pattern chain and the pawls S, S', while the pawls are so connected together, that under no circumstances can the two be brought simultaneously into contact with their ratchet wheels, and thus all risk of breakage, from any accident to the parts in connection with the pawls is avoided.

I do not claim the employment of two ratchet wheels upon the same shaft, with teeth in reverse directions, and which are actuated by separate and independent pawls driven by independent machinery. But What I do claim is—

1. The combination of a single pattern chain and the double acting pawls S, S', constructed and arranged as set forth, with the two ratchet wheels upon the cam shaft, for the purpose of driving the latter in either direction as may be required; the whole operating in the manner substantially as described.

2. The combination of the ratchet wheels $a$ and $b$, upon the cam shaft F, the gearing H, $c$, I M, and the cam K the whole arranged, in the manner described for the purpose set forth.

ED. W. BROWN.

Witnesses:
 LOUIS LAPHAM,
 A. S. LINDSEY.